| United States Patent [19] | [11] Patent Number: 4,564,718 |
|---|---|
| Still et al. | [45] Date of Patent: Jan. 14, 1986 |

[54] FUNCTIONALLY TERMINATED POLYMERS FROM TERPENE MONOMERS AND THEIR APPLICATIONS

[75] Inventors: Richard H. Still, Disley; John L. Cawse; John L. Stanford, both of Manchester, all of United Kingdom

[73] Assignee: The University of Manchester Institute of Science and Technology, Manchester, England

[21] Appl. No.: 640,769

[22] Filed: Aug. 14, 1984

[51] Int. Cl.[4] .......................... C08F 2/38; C07C 13/00
[52] U.S. Cl. ..................................... 585/350; 585/947
[58] Field of Search ............... 526/308, 212, 384, 230, 526/82, 83, 84, 281, 282, 335, 336; 525/384

[56] References Cited

U.S. PATENT DOCUMENTS

| 2,354,775 | 8/1944 | Rummelsburg | 526/308 |
|---|---|---|---|
| 2,520,338 | 8/1950 | Robertson | 526/219 |
| 3,886,192 | 5/1975 | Reed, Jr. | 526/219 |
| 4,077,893 | 3/1978 | Kiovsky | 525/384 |
| 4,137,390 | 1/1979 | Ofstead | 526/308 |

FOREIGN PATENT DOCUMENTS

| 5170705 | 6/1976 | Japan | 585/947 |
|---|---|---|---|
| 759529 | 8/1980 | U.S.S.R. | 585/350 |

*Primary Examiner*—Joseph L. Schofer
*Assistant Examiner*—Peter F. Kulkosky
*Attorney, Agent, or Firm*—Pravel, Gambrell, Hewitt & Kimball

[57] ABSTRACT

A method of preparing a functionally terminated polymer comprising polymerizing a terpene or an oxygen derivative thereof having a double bond or conjugated double bond available for polymerization with an initiator having a grouping which provides, or is a precursor of, the functional termination for the polymer.

19 Claims, No Drawings

FUNCTIONALLY TERMINATED POLYMERS FROM TERPENE MONOMERS AND THEIR APPLICATIONS

The invention relates to functionally terminated polymers. The invention is concerned particularly, but by no means exclusively, with polymers referred to as 'liquid rubbers' i.e. polymers with glass transition temperatures ($T_g$'s) substantially less than room temperature.

Functionally terminated liquid rubbers are used in numerous applications, including the production of sealants, coating materials, lubricants, elastomers, foams and solid rocket propellants. The liquid rubbers themselves are often of low molecular weight (1000–8000 typically) but the presence of two or more reactive functionalities at the polymer chain ends render these liquid rubbers suitable for the preparation of high polymers by reaction with other polyfunctional reagents. For example, dihydroxy-terminated liquid rubbers can yield polyurethanes by reaction with diisocyanates; polyesters by reaction with diacylhalides; or epoxies by reaction with diepoxides, amongst other polymers.

The fluid nature of the rubbers is important in enabling the manipulation of the reactants at ambient temperatures, and this is particularly desirable in automated operations such as reaction injection moulding for which it is essential that both components employed in the process be in the liquid state at room temperature.

However, the only liquid reactive rubbers of commercial importance are based on feedstocks which are obtained from fossil fuels, for example butadiene from oil.

It is an object of this invention to provide functionally terminated polymers which may be obtained from renewable feedstocks and which may be prepared by simpler techniques than the presently available liquid rubbers.

According to the present invention there is provided functionally terminated polymers obtained by polymerisation of a terpene or oxygen derivative thereof having a double bond or conjugated double bond available for polymerisation with an initiator having a grouping which provides, or which may be used to generate, the desired functional termination for the polymer.

The polymers of the invention thus have terminal functional groups which are either the same as a functional group present in the initiatior or which are generated from a group present in the initiator.

The terminal functional groups may for example by hydroxyl, amino or carboxyl groups. The terminal groups allow the polymers of the invention to be reacted with other components to provide elastomers, sealants, adhesives and also allow them to be used as rubber toughening agents. For example, polymers of the invention having terminal hydroxyl groups may be used for producing polyurethanes or polyesters.

The terpenes (or oxygen derivatives) used for preparing the polymers are those having a double bond or conjugated double bond available for polymerisation, i.e. not prevented by steric hindrance from undergoing polymerisation. The oxygen derivatives of terpenes which may be used include ketones and aldehydes. In the following description reference to terpenes is to be understood as including the oxygen derivatives.

Preferably the terpenes are acyclic, monocyclic or bicyclic mono terpenes of 10 carbon atoms. Examples of suitable terpenes are shown below:

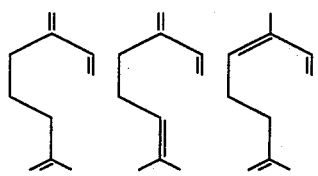

α-Myrcene    β-Myrcene    cis-α-ocimene

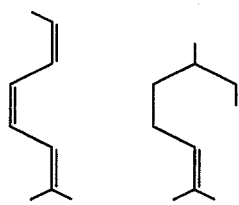

4-cis-6-cis-    Dihydromyrcene
Alloocimene 1

ACYCLIC MONOTERPENE HYDROCARBONS

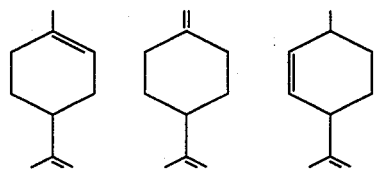

Dipentene    1,8-p-         Trans-iso-
(Limonene)   Menthadiene   Limonene

MONOCYCLIC MONOTERPENE HYDROCARBON

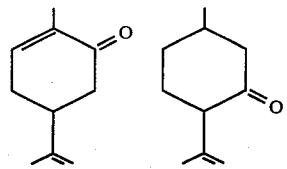

Carvone         iso-Pulegone

MONOCYCLIC TERPENE KETONES

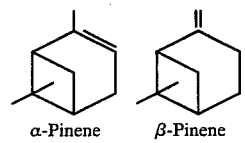

α-Pinene    β-Pinene

BICYCLIC MONOTERPENES

Most of these terpenes are readily available from the paper-pulping and fruit processing industries, or, in the case of myrcene and ocimene, can be easily produced from such terpenes. For example myrcene is obtained in high yield by the pyrolysis of pinene. The process described in this patent is therefor likely to be of particular interest in those areas of the world where terpenes are readily available but oil-based feedstocks are expensive.

The polymers of the invention preferably have a molecular weight of 500 to 20,000 and are most preferably liquid rubbers, i.e. having Tg's well below room temperature. Such liquid rubbers may be obtained by polymerising an acyclic monoterpene or a mixture of a cyclic monoterpene containing at least 10% of an acyclic terpene (more preferably at least 50% of the acyclic terpene). The preferred acyclic monoterpenes for preparing the polymers of the invention are β-myrcene and cis-α-ocimene.

In general, the process used to convert the terpenes to the polymers of the invention involves the formation of a polymer by the use of a suitable initiator, preferably a free radical or anionic initiator.

The initiator may for example contain a hydroxyl, carboxyl or amino group which provides the functional termination for the polymer. The chain termination steps of the polymerisation reaction ensure that the polymers obtained have the functional group at each end of the chain. Alternatively the initiator may be chosen such that it contains a grouping which, when incorporated in the polymer, may be used to generate the desired functional termination.

The invention will be further described with specific reference to the formation of terpene polymers with terminal hydroxyl groups, although it should be appreciated that polymers with other terminal functionalities may be prepared by similar methods.

For the preparation of polymers by free radical methods, initiators are used which preferably contain hydroxyl groups, for example hydrogen peroxide or hydroxy-substituted azo initiators. The polymerisation then proceeds via a route such as:

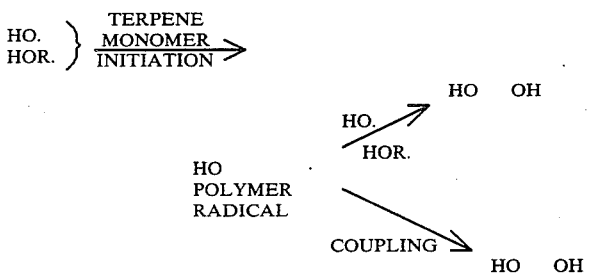

Diols may be formed either by combination of a hydroxy-terminated polymer radical with initiator radical, or by a coupling reaction.

An alternative method is by the formation of a 'living' polymer using a suitable radical anion as initiator (for example sodium naphthalene) followed by addition of the required amount of monomer and finally generating the hydroxyl groups by the addition of an epoxide or an aldehyde.

A feature of the invention is that reaction can be carried out at atmospheric pressure owing to the moderate boiling points of monoterpenes. This is an obvious advantage over polymerisations of butadiene and isoprene which have to be carried out in sealed vessels.

The polymerisation is carried out in the presence of a solvent for initiator and monomer. Suitable solvents include alcohols such as isopropanol, n-butanol and pentanols as well as polar, aprotic solvents such as acetonitrile and dimethylformamide.

It should be noted that the solvent should be non-reactive towards the reactants and products. Thus alcohols should not be used as solvents in the production of carboxy-terminated terpene polymers as ester functionalities are produced.

The exact choice of solvent depends on the particular initiator system being used. For example, polymerisation using hydrogen peroxide or azo initiators are carried out at temperatures typically in the range 50° to 100° C. Solvents suitable in this case would be propanol and butanol which are sufficiently volatile to be easily removed during the purification stage. Solvents like dioxan may be suitable when azo-initiators are used. In anionic polymerisation, less polar solvents may be used and at lower temperatures depending on the initiator used. Thus tetrahydrofuran, toluene or ethers may be suitable solvents.

In a typical case, the chosen terpene is dissolved in an alcohol along with hydrogen peroxide, and the mixture is heated to about 100° for several hours. After this time, the solvent and residual monomers are removed by vacuum distillation. The need for further purification of the product will depend on the nature of the monomer: some monomers, particularly conjugated dienes are prone to form oligomers. For example, myrcene can dimerise via the thermally initiated Diels-Alder reaction to give a mixture of at least four products, and it may be desirable to remove such products, if present in significant quantities, by a simple extraction procedure.

An example of this procedure follows, and some uses for the hydroxy terminated liquid rubbers are then described.

EXAMPLE 1

Preparation of a hydroxy-terminated polymyrcene

Technical grade myrcene was first vacuum evaporated to free it from any polymer etc. formed during storage. 200 ml of this myrcene (still containing ψ- and 1- limonene and ≈80% myrcene) was mixed with 133 ml n-butanol and 20 ml 50% hydrogen peroxide, and the mixture, contained in a 1 l flask with long condenser, purged with nitrogen for 30 minutes then heated to reflux. The refluxing was continued 7 hours and the mixture was then rotary evaporated under vacuum leaving 94 g crude polyol. A few crystals of quinone were added to prevent atmospheric oxidation and the mixture was slurried with two successive portions of methanol (100 ml), allowed to settle each time and the methanol decanted off. The methanol contained oligomeric material of low functionality (11 g). The remaining polyol layer was dissolved in isopentane and dried over anhydrous magnesium sulphate then filtered and evaporated to yield 80 g of a colourless, viscous liquid.

The polyol has the following characteristics. Equivalent weight (by acetylation): 1322. Molecular weight (number average) by vapour pressure osmometry: 2110; by gel permeation chromatography, 2300. Polydispersity (by GPC)=1.75.

Infra red spectrum (NaCl plates)=3400 broad, OH-stretch. 3100 absent (band present in myrcene). 1600 absent (conjugated double bond C=C stretch, present in myrcene). 1450(s), 1390s, 1120m, 840m.

$^1$H NMR spectrum. 20% solution in $CCl_4$. 220 MHz, tetramethylsilane internal standard. δ: 5.05, 2 protons in olefinic sites. 1.97, broad multiplet 8 protons in methylenic $CH_2$; 1.6 and 1.53, total of 6 protons on methyl groups.

Glass transition temperature. (Dupont 990, DSC mode, 20° $min^{-1}$ heating rate) $-57°$ C.

EXAMPLE 2

Preparation of a polyurethane elastomer from a polymyrcene diol 10.1 parts of the above polyol containing 0.1% w/w quinone were reacted with 3.11 parts 4,4'-diisocyanato phenylmethane (MDI) under vacuum at 70° for 1 hour with constant agitation. To the clear viscous liquid was then added 0.77 parts 1,4-butanediol and the mixture stirred once more under vacuum for a further 45 sec. The mixture was now milky and was poured into a flat PTFE mould, and cured at 100° for 1 hour followed by 14 hours at 80°. The resultant polymer was a white, soft rubber. It had an elongation at break of 190%, tensile strength 2.3 MPa and Young's Modulus ~ 1 MPa. (Tested at 23°, strain rate 20 mm min$^{-1}$). Its $T_g$, was −56° and it displayed a melting endotherm at 203°. (by DSC, heating rate 20° min$^{-1}$).

By contrast a polymer prepared directly from the above polyol and MDI, without chain extension using butanediol, was a clear, soft tacky rubber with elongation at break of 220%, tensile strength 0.24 MPa and modulus 0.1 MPa. It displayed a $T_g$ of −54° but no other transitions.

Similar polyols were prepared using different hydrogen peroxide concentrations but otherwise under similar conditions to those in Example 1. Details are given below.

| Run | % H$_2$O$_2$ w/w | Equiv wt. | $\overline{M}n$ (VPO) | $\overline{M}n$ (GPC) | $\overline{f}n$ (GPC)* |
|---|---|---|---|---|---|
| 1 | 0.5 | 3190 | 4000 | 4100 | 1.3 |
| 2 | 1.0 | 2260 | 3400 | 3400 | 1.5 |
| 3 | 1.9 | 1910 | 3300 | 3000 | 1.6 |
| 4 | 3.6 | 1650 | 3800 | 3500 | 2.1 |
| 5 | 5.4 | 1350 | 3100 | 3100 | 2.3 |

*Number average functionality

When these polyols were reacted with stoichiometric amounts of MDI, gels were formed in each case, those from Runs 1 and 2 were tacky and those from Runs 3, 4 and 5 were non sticky. All were clear and low in colour.

EXAMPLE 3

Use of a polymyrcene diol for rubber toughening a PU network

It was found that incorporating a small amount (4% w/w) of a polymyrcene diol into a high-$T_g$ polyurethane network resulted in improved physical properties. The network was prepared from MDI, trimethylol propane (TMP) and an oxypropylated triol, LHT 240.

Thus, 4.2 parts polyol, 21.6 parts TMP and 12.2 parts LHT 240 were stirred under vacuum at 50° for 30 minutes and 68.0 parts MDI were then added. The mixture was stirred a further 3 minutes until it had become clear and was then poured into a PTFE mould and cured at 150° for 1½ hours. An unmodified polymer, prepared as a control, was also made using 58.5 parts MDI, 10.0 parts LHT 240 and 18.9 parts TMP and the same conditions as above. The physical properties of these materials were as follows:

| PROPERTY | 0% RUBBER | 4% RUBBER |
|---|---|---|
| Tensile Strength, MPa | 79 | 81 |
| Ultimate Strain, % | 4.8 | 7.1 |
| Modulus, GPa (a) | 3.0 | 2.8 |
| Toughness MPa | 94 | 156 |
| Tg °C. | 155 | 153 |
| $G_c$ kJm$^{-2}$ (b) | 1.33 | 1.48 |
| Appearance | COLOURLESS GLASS | WHITE GLASS |

(a) Area under stress-strain curve.
(b) Fracture energy in impact test, see G. P. Marshall et al. J. Mater. Sci. 8, 949, (1973).

EXAMPLE 4

Preparation of a carboxy-terminated polymyrcene 30 ml of myrcene (96% purity by GLC analysis) were mixed with dioxan (30 ml) and the reaction mixture was purged with nitrogen. Azobiscyanopentanoic acid (2.47 g) was added and this mixture was heated at 70° C. for 7 hours. The solvent and residual monomer was then removed by rotary film evaporation under vacuum after the addition of a few crystals of benzoquinone to prevent atmospheric oxidation. The viscous product obtained was then dissolved in n-pentane (25 ml) and shaken with methanol (150 ml).

The mixture was allowed to stand overnight and the methanol layer was decanted and the pentane layer was dried over anhydrous magnesium sulphate, filtered, and rotary evaporated to yield 13.01 g (54% conversion) of a viscous pale yellow liquid.

The carboxy-terminated polymyrcene had the following characteristics. Equivalent weight: 1840 (titration of a methylene chloride solution with alcoholic potassium hydroxide). Molecular weight (number average) by vapour pressure osmometry: 4030. Number average functionality 2.19. Infra red spectrum (NaCl) plates indicated that myrcene monomer was absent (no band at 1600 cm$^{-1}$), 1720 (>C=O stretch in —CO$_2$H) and a small band at 2250 cm$^{-1}$ (—C≡N).

It should be noted that the solvent used in this Example (dioxan) is inert with respect to the reactants and products. Attempts to prepare carboxy terminated polymyrcenes in n-butanol (the solvent used in Example 1 for producing hydroxy-terminated polymyrcenes) resulted in products containing ester functionality.

What is claimed is:

1. A method of preparing a liquid prepolymer having an average functionality greater than one comprising polymerising terpene monomer having a double bond or conjugated double bond available for polymerisation in a solvent with at least about two mole percent, based on the molar amount of monomer component, of an initiator having a grouping which provides or is a precursor of, the functional termination for the prepolymer.

2. A method as claimed in claim 1 wherein the terpene is an acyclic monoterpene hydrocarbon.

3. A method as claimed in claim 2 wherein the acyclic monoterpene is selected from the group consisting of α-myrcene, β-myrcene, cis-α-ocimene, 4-cis-6-cis-allöocimene and dihydromyrcene.

4. A method as claimed in claim 1 wherein an oxygen derivative of a terepene is used and said derivative is selected from the group consisting of aldehydes and ketones.

5. A method as claimed in claim 4 wherein the oxygen derivative is ketone and is selected from the group consisting of carvone and iso-pulegone.

6. A method as claimed in claim 1 wherein the terpene is a monocyclic monoterpene hydrocarbon.

7. A method as claimed in claim 6 wherein the monocyclic monoterpene hydrocarbon is selected from the group consisting of limonene, 1,8-p-menthadiene, and trans-iso-limonene.

8. A method as claimed in claim 1 wherein the terpene is a bicyclic monoterpene.

9. A method as claimed in claim 8 wherein the bicyclic monoterpene is selected from the group consisting of α-pinene and β-pinene.

10. A method as claimed in claim 1 wherein the reaction is carried out in the presence of a solvent for the initiator and the monomer.

11. A method as claimed in claim 1 wherein the initiator is a free radical initiator.

12. A method as claimed in claim 11 wherein the initiator contains a hydroxyl group.

13. A method as claimed in claim 12 wherein the initiator is selected from hydrogen peroxide and hydroxy-substituted azo initiators.

14. A method as claimed in claim 12 wherein the reaction is conducted at a temperature of 50°–100° C.

15. A method as claimed in claim 12 which is conducted in an alcohol as solvent.

16. A method as claimed in claim 1 wherein the initiator contains a carboxyl group.

17. A method as claimed in claim 16 wherein the initiator is a carboxy substituted azo initiator.

18. A method as claimed in claim 16 wherein the reaction is conducted in a solvent which is non-reactive with respect to the carboxy groups.

19. A liquid prepolymer having an average functionality greater than one obtained by polymerisation of terpene monomer having a double bond or conjugated double bond available for polymerisation in a solvent with at least two mole percent, based on the molar amount of monomer component, of an initiator having a grouping which provides, or is a precursor of, the functional termination of the prepolymer.

* * * * *